US012766731B2

(12) United States Patent
Nishizaka et al.

(10) Patent No.: US 12,766,731 B2
(45) Date of Patent: Oct. 20, 2026

(54) ROBOT SYSTEM, CONTROLLER AND CONTROL METHOD

(71) Applicant: KABUSHIKI KAISHA YASKAWA DENKI, Kitakyushu (JP)

(72) Inventors: Yoshitaka Nishizaka, Fukuoka (JP); Tomoyuki Horiuchi, Fukuoka (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 142 days.

(21) Appl. No.: 18/810,520

(22) Filed: Aug. 21, 2024

(65) Prior Publication Data

US 2025/0114943 A1 Apr. 10, 2025

(30) Foreign Application Priority Data

Oct. 5, 2023 (JP) ................................ 2023-173423

(51) Int. Cl.
*B25J 9/16* (2006.01)

(52) U.S. Cl.
CPC ........... *B25J 9/1694* (2013.01); *B25J 9/1664* (2013.01)

(58) Field of Classification Search
CPC ...... B25J 9/1694; B25J 9/1664; B25J 9/1628; B25J 9/1697; G05B 19/4182; G05B 2219/37434; G05B 2219/39102
See application file for complete search history.

(56) References Cited

U.S. PATENT DOCUMENTS 8,250,743 B2 * 8/2012 Habisreitinger ........ B23P 21/00 901/6
9,156,626 B2 * 10/2015 Kaneyasu ............ B62D 65/028
2025/0114943 A1 * 4/2025 Nishizaka .............. B25J 9/1664
2025/0336222 A1 * 10/2025 Kleinikkink ........ H01M 50/204

FOREIGN PATENT DOCUMENTS

JP 5733516 B2 12/2012
JP 2021-045835 3/2021

* cited by examiner

*Primary Examiner* — Masud Ahmed
(74) *Attorney, Agent, or Firm* — MORI & WARD, LLP

(57) ABSTRACT

A robot system includes a robot having a tool configured to perform work on a target portion of a workpiece and an arm to which the tool is connected and which is configured to move the tool, vibration detection circuitry configured to detect vibration of the workpiece in a vibration direction, estimation circuitry configured to estimate an arrival timing at which the workpiece arrives at a return position in the vibration direction based on the vibration detected by the vibration detection circuitry, and control circuitry configured to control the arm based on the arrival timing such that the tool performs the work on the target portion.

20 Claims, 7 Drawing Sheets

ROBOT SYSTEM, CONTROLLER AND CONTROL METHOD

CROSS-REFERENCE TO RELATED APPLICATIONS

The present application claims priority under 35 U. S. C. § 119 to Japanese Patent Application No. 2023-173423, filed Oct. 5, 2023. The contents of this application are incorporated herein by reference in their entirety.

BACKGROUND OF THE INVENTION

Field of the Invention

The present disclosure relates to a robot system, a controller, and a control method.

Discussion of the Background

Japanese Patent Application Laid-Open No. 2021-045835 discloses a robot system. The robot system includes a first imaging unit that images the workpiece conveyed by the conveying unit once or a plurality of times, a detecting unit that detects the workpiece based on the image captured by the first imaging unit, a robot that takes out the workpiece conveyed by the conveying unit, a height acquiring unit that acquires the height of the workpiece based on the captured image, and a condition limiting unit that limits a detection condition used for detection by the detecting unit when the height acquired by the height acquiring unit is equal to or greater than a predetermined threshold.

SUMMARY OF THE INVENTION

In accordance with one aspect of the present disclosure, a robot system includes a robot having a tool configured to perform work on a target portion of a workpiece and an arm to which the tool is connected and which is configured to move the tool, vibration detection circuitry configured to detect vibration of the workpiece in a vibration direction, estimation circuitry configured to estimate an arrival timing at which the workpiece arrives at a return position in the vibration direction based on the vibration detected by the vibration detection circuitry, and control circuitry configured to control the arm based on the arrival timing such that the tool performs the work on the target portion.

In accordance with another aspect of the present disclosure, a controller includes vibration detection circuitry configured to detect vibration of a workpiece in a vibration direction, estimation circuitry configured to estimate an arrival timing at which the workpiece arrives at a return position in the vibration direction based on the vibration detected by the vibration detection circuitry, and control circuitry configured to control an arm of a robot based on the arrival timing such that a tool connected to the arm performs work on a target portion of the workpiece.

In accordance with the other aspect of the present disclosure, a control method includes detecting vibration of a workpiece in a vibration direction, estimating an arrival timing at which the workpiece arrives at a return position in the vibration direction based on the detected vibration, and controlling an arm of a robot based on the arrival timing such that a tool connected to the arm performs work on a target portion of the workpiece.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings.

DESCRIPTION OF THE EMBODIMENTS

Figure 1:
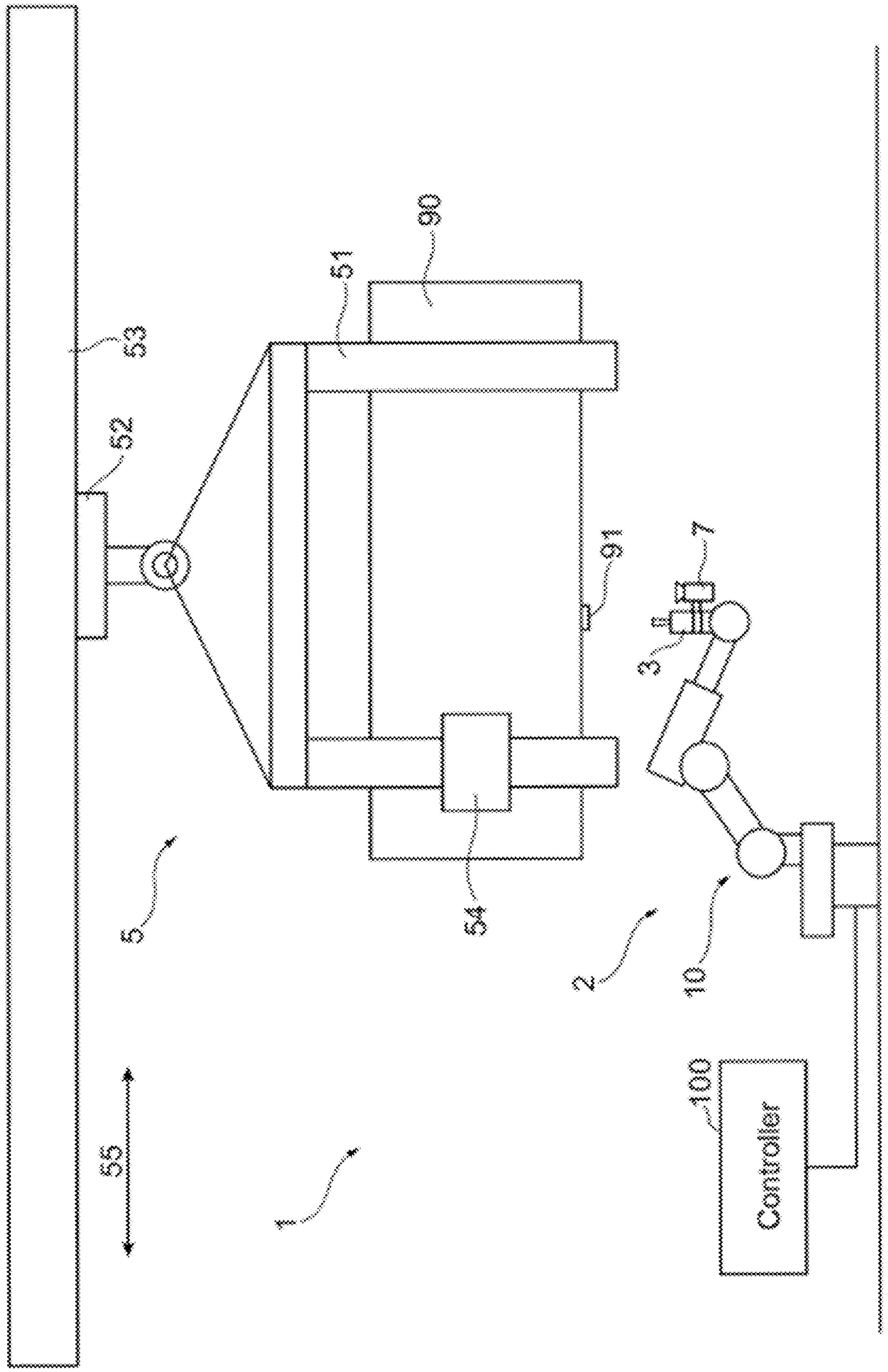
FIG. 1 is a schematic view illustrating a configuration of a robot system.

Hereinafter, embodiments will be described in detail with reference to the drawings. In the description, the same elements or elements having the same functions are denoted by the same reference numerals, and redundant description will be omitted.

[Robot System]

A robot system 1 illustrated in FIG. 1 is a system in which a robot 2 automatically performs work on a workpiece 90. The workpiece 90 is not particularly limited, and examples thereof include a body of an automobile, an aircraft, or the like.

The workpiece 90 includes a target portion 91 to be worked by the robot 2. The work performed by the robot 2 on the workpiece 90 is not particularly limited, but an example of the work is a work of attaching a seal to a hole formed in the target portion 91. Other examples of the work performed by the robot 2 on the workpiece 90 include arc welding at the target portion 91, spot welding at the target portion 91, and application of a sealing material to the target portion 91.

As shown in FIG. 1, the robot system 1 includes a conveyor 5, a robot 2, a first camera 6 (see FIG. 2), a second camera 7, and a controller 100. The conveyor 5 conveys the workpiece 90 along a predetermined conveying direction 55. The conveying direction 55 is, for example, horizontal. Hereinafter, for convenience of description, a direction in which the conveyor 5 conveys the workpiece 90 is referred to as "front".

Figure 2:
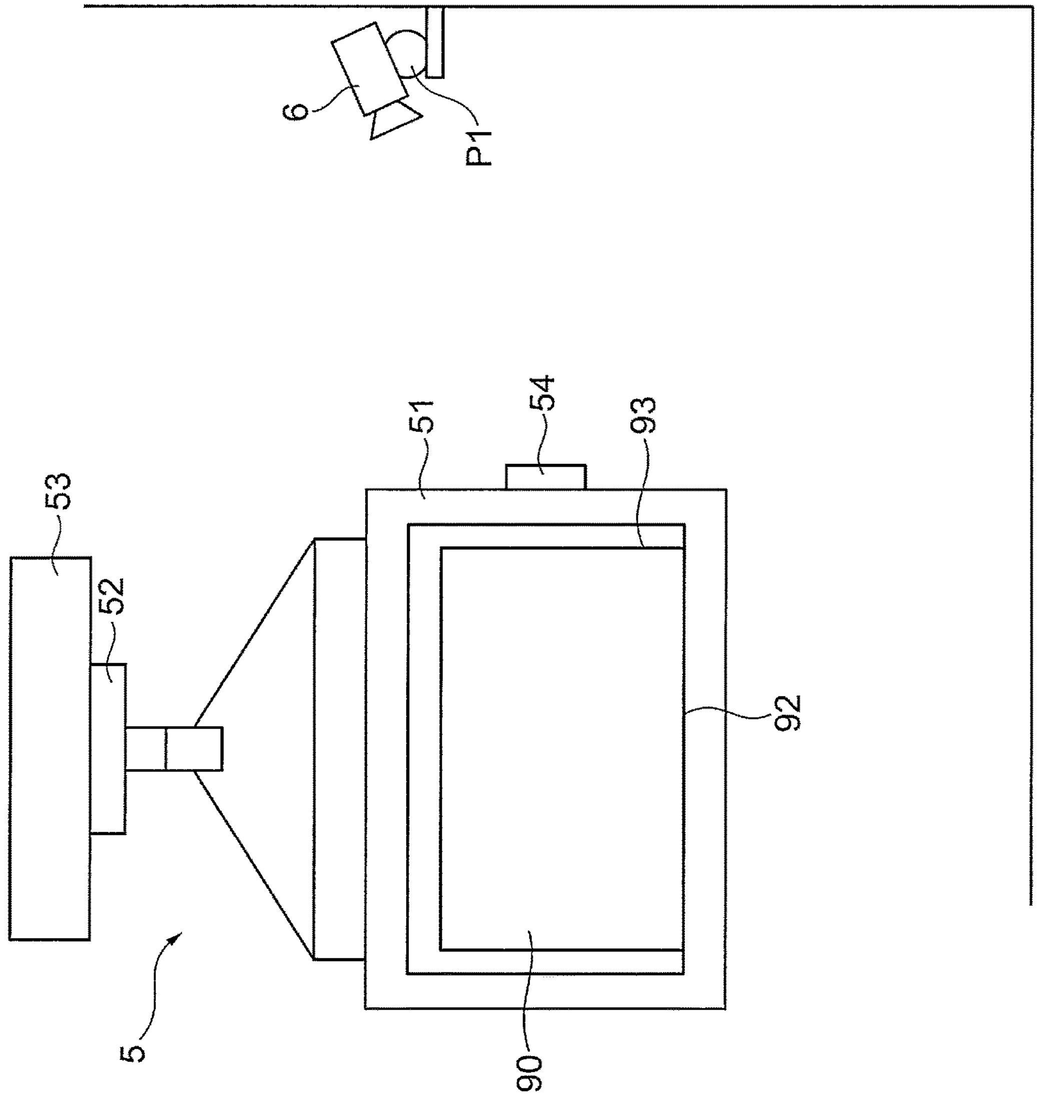
FIG. 2 is a schematic view illustrating the configuration of the robot system.

The conveyor 5 includes a hanger 51, a moving body 52, a driving unit (an example of "a driver") 53, and a marker 54. The hanger 51 holds the workpiece 90. For example, the hanger 51 holds the workpiece 90 with the target portion 91 facing downward. As shown in FIG. 2, the hanger 51 surrounds the workpiece 90 as viewed from the front.

The moving body 52 hangs the hanger 51 from above. The driving unit 53 moves the moving body 52 along the conveying direction 55 to convey the workpiece 90 held by the hanger 51 along the conveying direction 55.

The marker 54 is attached to a side surface of the hanger 51. The marker 54 is an imaging target of the first camera 6 described later. For example, the marker 54 has a plurality of motifs arranged in a matrix. For example, the marker 54 may be a lattice in which a plurality of squares is arranged in a matrix as the plurality of motifs. The position and the posture of the marker 54 with respect to the first camera 6 can be detected based on the position, the size, the shape, and the like of the marker 54 captured by the first camera 6.

In the above description, the suspended conveyor 5 that suspends and conveys the workpiece 90 from above is exemplified. The conveyor 5 may be a conveyor 5 (for example, a belt conveyor 5 or a roller conveyor 5) that supports and conveys the workpiece 90 from below.

The robot 2 includes a tool 3 and an arm 10. The tool 3 is used to perform work on a target portion 91 of the workpiece 90. When the work is to apply a seal to a hole, the tool 3 is, for example, a suction nozzle that and holds the seal. When the work is arc welding, the tool 3 is, for example, a welding torch. When the work is spot welding, the tool 3 is, for example, a spot welding gun. When the work is application of a sealing material, the tool 3 is, for example, a dispenser.

The arm 10 displaces (moves) the tool 3. Displacing (moving) includes at least changing the position. The displacing may further comprise changing the posture. For example, the arm 10 may be capable of changing the position of the tool 3 in each of three axial directions in a three-axis orthogonal coordinate system representing coordinates n a three dimensional space, and may be capable of changing the posture of the tool 3 around each of the three axial directions.

Figure 3:
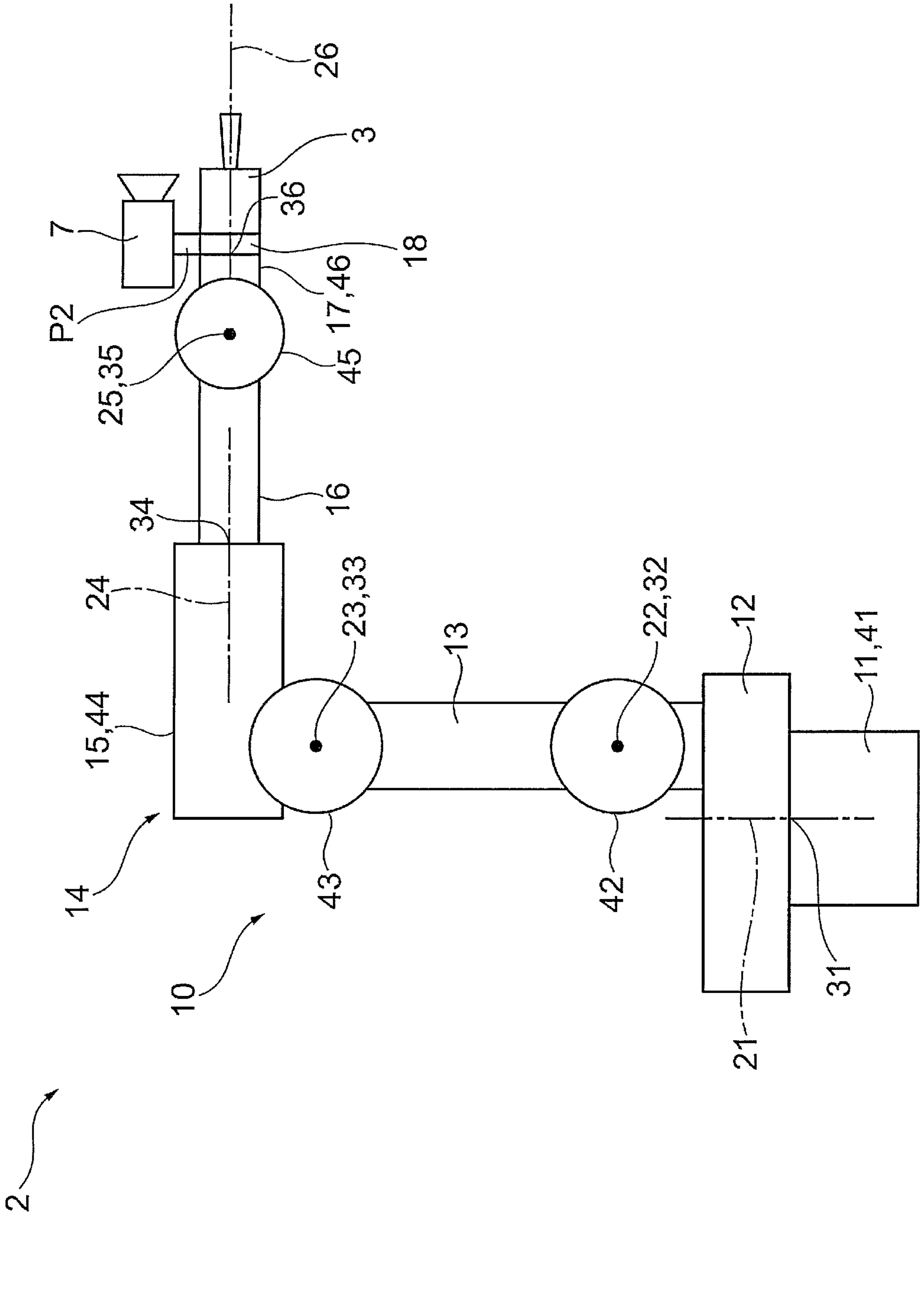
FIG. 3 is a schematic view illustrating the configuration of a robot.

As shown in FIG. 3, the arm 10 is, for example, a six axis vertical articulated arm, and includes a base portion 11, a turning portion 12, a first arm 13, a second arm 14, a third arm 17, and a distal end portion 18. The base portion 11 is installed on the floor surface below the workpiece 90 conveyed by the conveyor 5. The base portion 11 may be installed on a moving body such as an unmanned carrier.

The turning portion 12 is provided on the base portion 11 to turn around a vertical axis 21 (perpendicular to the installation surface). The first arm 13 is connected to the base portion 11 to swing around an axis 22 intersecting (for example, orthogonal to) the axis 21, and extends in a direction away from the axis 22. Crossing includes being in a twisted relationship with each other, such as in a grade separated crossing. The same applies to the following.

The second arm 14 is connected to the end of the first arm 13 so as to swing around an axis 23 parallel to the axis 22. The second arm 14 has an arm base portion 15 and an arm end portion 16. The arm base portion 15 extends in a direction away from the axis 23. The arm end portion 16 is connected to an end portion of the arm base portion 15 to pivot about an axis 24 along the central axis of the arm base portion 15, and further extends from the arm base portion 15 along the axis 24.

The third arm 17 is connected to an end of the arm end portion 16 to swing around an axis 25 intersecting (for example, orthogonal to) the axis 24, and extends in a direction away from the axis 25. The distal end portion 18 is connected to the third arm 17 to pivot about an axis 26 along the central axis of the third arm 17. The tool 3 is connected to the distal end portion 18.

Thus, the arm 10 has a joint 31 for enabling the turning portion 12 to turn about the axis 21 with respect to the base portion 11, a joint 32 for enabling the first arm 13 to swing about the axis 22 with respect to the turning portion 12, a joint 33 for enabling the arm base portion 15 to swing about the axis 23 with respect to the first arm 13, a joint 34 for enabling the arm end portion 16 to swing about the axis 24 with respect to the arm base portion 15, a joint 35 for enabling the third arm 17 to swing about the axis 25 with respect to the arm end portion 16, and a joint 36 for enabling the distal end portion 18 to swing about the axis 26 with respect to the third arm 17.

The actuator 41, 42, 43, 44, 45, 46 drives each of the joints 31, 32, 33, 34, 35, 36 and of the six axes. Each of the actuators 41, 42, 43, 44, 45, 46 includes, for example, an electric motor and a speed reducer. For example, the actuator 41 drives the joint 31 to turn the turning portion 12 about the axis 21. The actuator 42 drives the joint 32 to swing the first arm 13 around the axis 22. The actuator 43 drives the joint 33 to swing the arm base portion 15 around the axis 23. The actuator 44 drives the joint 34 to turn the arm end portion 16 about the axis 24. The actuator 45 drives the joint 35 to swing the third arm 17 around the axis 25. The actuator 46 drives the joint 36 to turn the distal end portion 18 about the axis 26.

The configuration of the arm 10 exemplified above is merely an example, and can be changed as long as the tool 3 can be displaced. For example, the arm 10 may be a redundant robot in which one or more redundant axes are added to the above-described six axis joints. The arm 10 may be a scalar type robot or a parallel link type robot.

The first camera 6 is attached to the periphery of the robot 2 to be directed toward the workpiece 90 from a first reference position P1 that is not displaced (not moved) along with the tool 3 (see FIG. 2). The second camera 7 (camera) is attached to the robot 2 to be directed toward the workpiece 90 from a second reference position P2 (reference position) that is displaced (moved) along with the tool 3. The first camera 6 and the second camera 7 are devices capable of capturing still images and moving images. The camera includes an optical lens, an imaging element, an image processing circuit, and the like. The optical lens collects light from a subject and forms an image on the imaging element. The imaging element converts the imaged light into an electronic signal. As the imaging element, for example, a Complementary Metal-oxide-semiconductor (CMOS) sensor, a charge coupled device (CCD) sensor, or the like is used. The image processing circuit converts the electronic signal output from the imaging element into digital image data.

The second camera 7 may be attached to the robot 2 to be directed toward a first surface 92 of the workpiece 90 including the target portion 91, and the first camera 6 may be attached to the periphery of the robot 2 to be directed toward a second surface 93 of the workpiece 90 different from the first surface 92. The surfaces of the workpiece 90 being different from each other means a relationship in which one surface is hidden by the workpiece 90 and is not visually recognized in a situation in which the other surface can be visually recognized.

For example, the first surface 92 is a lower surface of the workpiece 90, and the second surface 93 is a side surface of the workpiece 90. The first camera 6 is attached to a wall surface or the like on a side of the conveyor 5 so as to be directed toward the second surface 93 from the first reference position P1 (see FIG. 2). The first camera 6 is arranged to be directed toward the marker 54 of the conveyor 5 along with the second surface 93. The second camera 7 is attached to the robot 2 to be directed toward the first surface 92 from the second reference position P2. For example, the second camera 7 is attached to the distal end portion 18 to be directed toward the target portion 91 from below in a state where the tool 3 is directed to the target portion 91 from below. The tool 3 being directed toward the target portion 91 means that a portion of the tool 3 that acts on the target portion 91 is directed toward the target portion 91.

The controller 100 controls the robot 2 to perform work on the target portion 91 by the tool 3. When the tool 3 performs work on the target portion 91, the workpiece 90 may vibrate. For example, when the above-described suspension-type conveyor 5 is used, vibration having a horizontal direction as a main component may occur in the workpiece 90.

When the vibration is generated in the workpiece 90, the target portion 91 is displaced while the tool 3 is displaced toward the target portion 91, and the tool 3 may not be arranged with high accuracy with respect to the target portion 91. The inability to arrange the tool 3 with high accuracy with respect to the target portion 91 may be a factor of a decrease in work quality.

Therefore, the controller 100 is configured to execute detecting the vibration of the workpiece 90, estimating the arrival timing at which the workpiece 90 arrives at the return position in the direction of the displacement caused by to the vibration based on the detection result of the vibration, and controlling the arm 10 to perform the work on the target portion 91 based on the arrival timing.

In the vicinity of the return position in the direction of the displacement caused by the vibration, the speed of the displacement of the workpiece 90 caused by the vibration is low. Therefore, by performing the work on the target portion 91 based on the arrival timing at which the workpiece arrives at the return position (for example, at the arrival timing), the displacement of the target portion 91 until the tool 3 arrives at the target portion 91 can be reduced. Therefore, the tool 3 can be arranged with high accuracy with respect to the workpiece 90 which vibrates.

Figure 4:
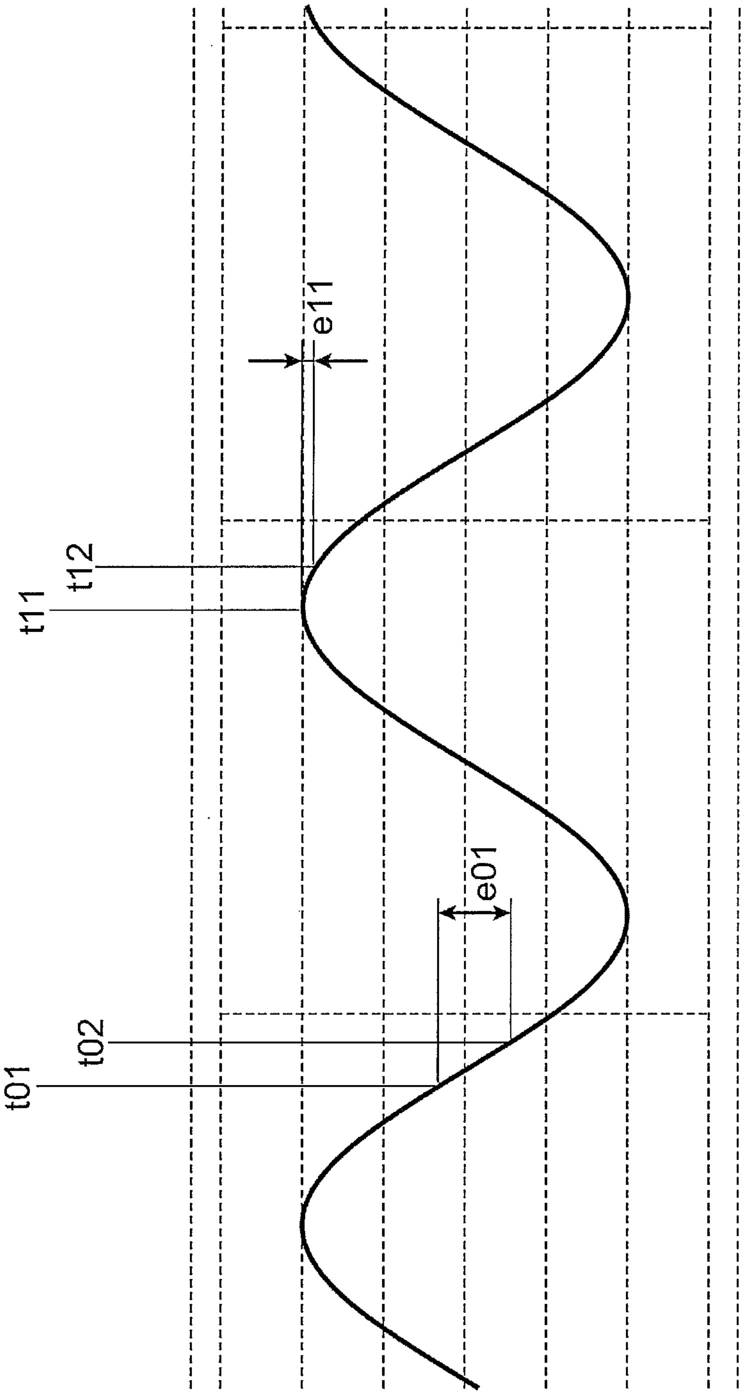
FIG. 4 is a graph illustrating a relationship between a displacement start timing of the tool and a displacement amount of the target portion until the tool arrives during the vibration of the workpiece.

FIG. 4 is a graph showing the vibration of the workpiece 90. The horizontal axis of FIG. 4 represents the passage of time, and the vertical axis of FIG. 4 represents the position of the workpiece 90 in the direction of the vibration. In FIG. 4, if the tool 3 is started to be displaced to the target portion 91 at the time t01 between the arrival timing and the next arrival timing, the target portion 91 is displaced by the amount of displacement e01 at the time t02 when the tool 3 arrives at the target portion 91, compared with the time e01. In contrast, when the tool 3 starts to be displaced to the target portion 91 at the time t11 which is the arrival timing, the target portion 91 is displaced by the amount of displacement ell at the time t12 when the tool 3 arrives at the target portion 91, compared to the time t11. The displacement amount ell when the displacement is started at the arrival timing is obviously smaller than the displacement amount e01 when the displacement is started between the arrival timing and the next arrival timing.

Figure 5:
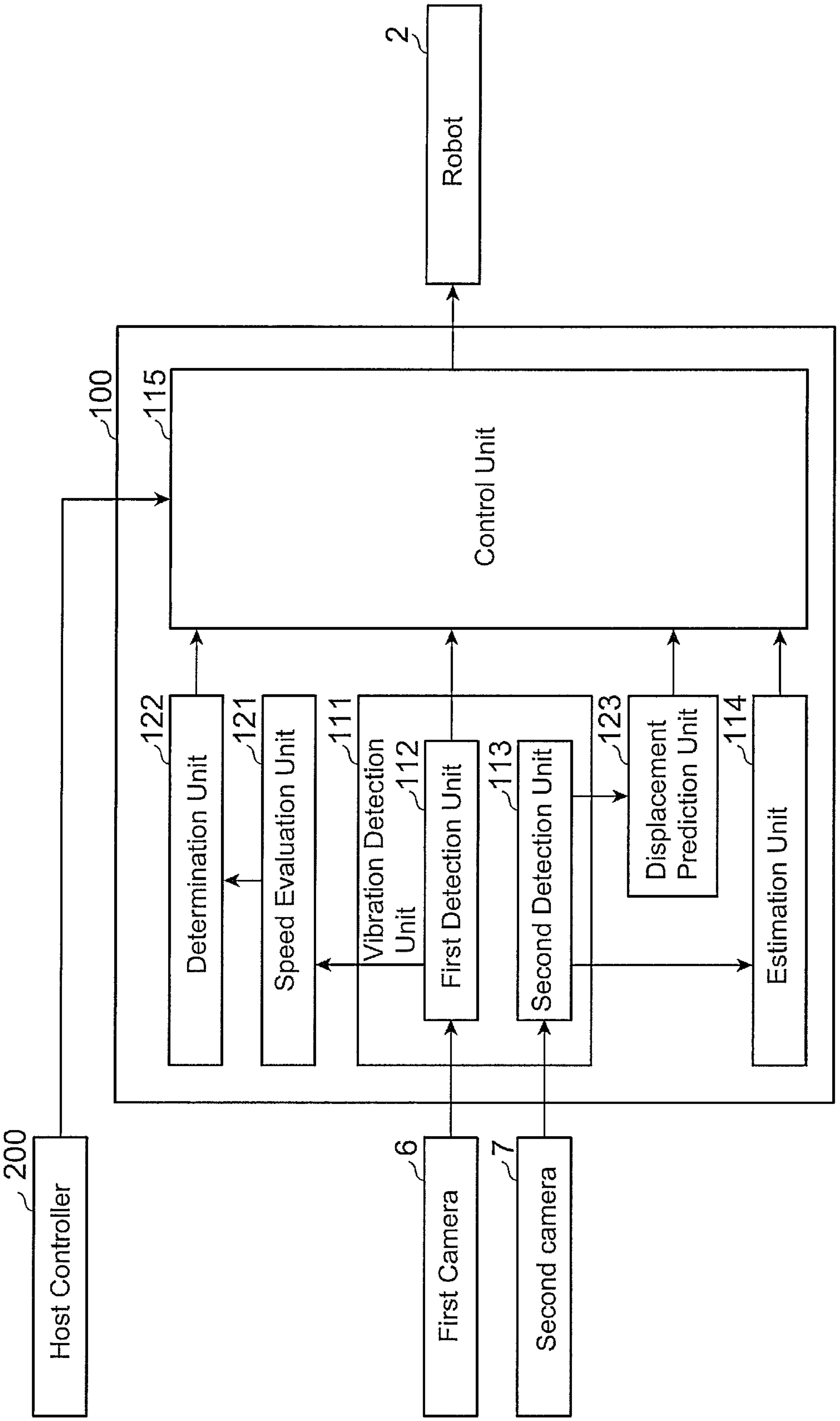
FIG. 5 is a block diagram illustrating a configuration of a controller.

As shown in FIG. 5, the controller 100 includes, for example, a vibration detection unit (an example of "vibration detection circuitry") 111, an estimation unit (an example of "estimation circuitry") 114, and a control unit (an example of "control circuitry") 115. The vibration detection unit 111 detects vibration of the workpiece 90. The vibration detection unit 111 may detect the vibration of the workpiece 90 based on the image of the workpiece 90 captured by the first camera 6 or the second camera 7. The vibration of the workpiece 90 can be easily detected in a non-contact manner.

The estimation unit 114 estimates the arrival timing at which the workpiece 90 arrives at the return position in the direction of the displacement caused by the vibration based on the detection result of the vibration. The arrival of the workpiece 90 at the return position means that the workpiece 90 substantially arrives at the return position. For example, the arrival of the workpiece 90 at the return position includes the arrival of the workpiece 90 in the vicinity of the return position. In addition, in a case where the vibration includes the vibration components in a plurality of directions, the arrival of the workpiece 90 at the return position does not necessarily mean that the workpiece 90 arrives at the return position in all of the plurality of directions, but means that the workpiece 90 arrives at the return position in at least one of the plurality of directions. For example, when the vibration includes components of the vibration in a plurality of directions, the estimation unit 114 may estimate the arrival timing at which the workpiece 90 arrives at the return position in a direction in which the amplitude is the largest.

For example, the estimation unit 114 sequentially checks the speed of the displacement of the workpiece 90 caused by to the vibration based on the detection result of the vibration, and estimates that the current time is the arrival timing at the moment when the displacement speed becomes zero or the direction of the displacement speed is reversed. The estimation unit 114 may estimate the next arrival timing before the workpiece 90 actually arrives at the return position, based on the waveform of the vibration represented by the detection result of the vibration and the current position of the workpiece 90 in the waveform.

The vibration detection unit 111 may detect the vibration of the workpiece 90 with respect to the reference position P1 (for example, the second reference position P2) which is displaced together with the tool 3. For example, the vibration detection unit 111 may detect the vibration of the workpiece 90 with respect to the second reference position P2 based on the image captured by the second camera 7. For example, the vibration detection unit 111 repeats calculation of the position of the target portion 91 with respect to the second camera 7 based on the position of the target portion 91 included in the image captured by the second camera 7, and generates time-series log data of the position of the target portion 91. The vibration detection unit 111 detects the vibration of the workpiece 90 with respect to the second reference position P2 from the history of displacements of the target portion 91.

The estimation unit 114 may estimate the arrival timing at which the workpiece 90 arrives at the return position in the displacement direction with respect to the tool 3, based on the vibration of the workpiece 90 with respect to the second reference position P2. The tool 3 can be displaced to the target portion 91 in a state where the relative displacement speed of the workpiece 90 with respect to the tool 3 is low. Therefore, the relative displacement of the target portion 91 with respect to the tool 3 until the tool 3 reaches the target portion 91 can be reduced.

The control unit 115 controls the arm 10 to perform the work on the target portion 91 based on the arrival timing (the estimated arrival timing). For example, the control unit 115 controls the arm 10 so that the tool 3 reaches the target portion 91 within a period in which the target portion 91 stays near the position of the target portion 91 at the arrival timing. As long as the tool 3 can reach the target portion 91 within the "staying period", the control unit 115 may start the displacement of the tool 3 to the target portion 91 before the arrival timing or may start the displacement of the tool 3 to the target portion 91 after the arrival timing. As an example, the control unit 115 controls the arm 10 to start the displacement of the tool 3 based on the arrival timing. For example, the control unit 115 controls the arm 10 to start the displacement of the tool 3 to the target portion 91 at the arrival timing. For example, the control unit 115 calculates a target arrival position of the tool 3 based on the position of the target portion 91 at the arrival timing, and controls the arm 10 to displace the tool 3 to the target arrival position.

For example, the controller 100 calculates the target operation angle of each of the joints 31, 32, 33, 34, 35, 36 by inverse kinematics calculation based on the target arrival position of the tool 3 and the model information of the arm 10, and operates each of the joints 31, 32, 33, 34, 35, 36 to the target operation angle by the actuator 41, 42, 43, 44, 45, 46. The model information of the arm 10 includes information such as the structure and the dimensions of each part of the arm 10.

The control unit 115 may wait for the arrival timing while controlling the arm 10 to displace the tool 3 following the conveyance of the workpiece 90 by the conveyor 5 and to keep the tool 3 disposed near the target portion 91. When the tool 3 is displaced following the conveyance of the workpiece 90, the control unit 115 acquires information such as the conveyance speed of the workpiece 90 from the host controller 200 or the like. Based on the acquired information, the control unit 115 repeatedly updates the following target position of the tool 3 so as to follow the conveyance of the workpiece 90. Every time the tracking target position of the tool 3 is updated, the control unit 115 calculates the target operation angle of each of the joints 31, 32, 33, 34, 35, 36, and by the inverse kinematics calculation, and operates each of the joints 31, 32, 33, 34, 35, 36, and to the target operation angle by the actuator 41, 42, 43, 44, 45, 46.

Since the tool 3 is displaced following the conveyance of the workpiece 90, the tool 3 is arranged in the vicinity of the target portion 91 until the arrival timing. Therefore, it is possible to shorten the time until the tool 3 reaches the target portion 91 after the arrival timing. Therefore, the displacement of the target portion 91 until the tool 3 reaches the target portion 91 can be further reduced.

The control unit 115 may calculate the target arrival position of the tool 3 based on the conveyance speed of the workpiece 90 by the conveyor 5 and the current position of the target portion 91 at the arrival timing, and control the arm 10 to start the displacement of the tool 3 to the target arrival position. For example, the control unit 115 calculates the time until the tool 3 reaches the target portion 91 based on the current position of the target portion 91, and calculates the displacement vector of the tool 3 for keeping the tool 3 follow the conveyance of the workpiece 90 based on the calculated time and the conveyance speed of the workpiece 90 by the conveyor 5. The control unit 115 calculates the target arrival position by adding the calculated displacement vector to the current position of the target portion 91.

By adjusting the target arrival position of the tool 3 to the displacement of the target portion 91 in the conveyance by the conveyor 5, the tool 3 can be made to arrive at the target portion 91 with higher accuracy.

The vibration detection unit 111 may include a first detection unit (an example of "first detection circuitry") 112 and a second detection unit (an example of "second detection circuitry") 113. The first detection unit 112 detects the first vibration of the workpiece 90 with respect to the first reference position P1. The first detection unit 112 may detect the first vibration based on the image captured by the first camera 6. The first vibration of the workpiece 90 can be easily detected in a non-contact manner. For example, the first detection unit 112 repeats calculation of the position and posture in the conveying direction 55 with respect to the first camera 6 based on the position, size, shape, and the like in the conveying direction 55 included in the image captured by the first camera 6, and generates time-series log data of the position and posture in the conveying direction 55. The first detection unit 112 detects the first vibration from the displacement history in the conveying direction 55 represented by the generated log data.

The second detection unit 113 detects the second vibration of the workpiece 90 with respect to the second reference position P2. The second detection unit 113 may detect the second vibration based on the image captured by the second camera 7. The second vibration of the workpiece 90 can be easily detected in a non-contact manner. For example, the second detection unit 113 repeats calculating the position of the target portion 91 with respect to the second camera 7 based on the position of the target portion 91 included in the image captured by the second camera 7, and generates time-series log data of the position of the target portion 91. The second detection unit 113 detects the second vibration from the displacement history of the target portion 91 represented by the generated log data.

The control unit 115 may wait for the arrival timing while controlling the arm 10 to displace the tool 3 following the first vibration. The control unit 115 may wait for the arrival timing while controlling the arm 10 to displace the tool 3 following the conveyance of the workpiece 90 by the conveyor 5 and the first vibration and to keep the tool 3 disposed near the target portion 91. For example, the control unit 115 calculates the time until the tool 3 reaches the target portion 91 based on the current position of the target portion 91, and calculates the displacement vector of the tool 3 for keeping the tool 3 follow the conveyance of the workpiece 90 and the first vibration based on the calculated time, the conveyance speed of the workpiece 90 by the conveyor 5, and the first vibration. The control unit 115 calculates the target arrival position by adding the calculated displacement vector to the current position of the target portion 91. When the tool 3 is displaced following the conveyance of the workpiece 90 and the first vibration, the control unit 115 repeatedly updates the following target position of the tool 3 so as to follow the conveyance of the workpiece 90 and the first vibration. Every time the tracking target position of the tool 3 is updated, the control unit 115 calculates the target operation angle of each of the joints 31, 32, 33, 34, 35, 36, and by the inverse kinematics calculation, and operates each of the joints 31, 32, 33, 34, 35, 36, and to the target operation angle by the actuator 41, 42, 43, 44, 45, 46. The estimation unit 114 may estimate the arrival timing at which the workpiece 90 arrives at the return position in the direction of the displacement caused by the second vibration based on the detection result of the second vibration.

Since the tool 3 is displaced following both the conveyance of the workpiece 90 and the first vibration, the relative vibration of the workpiece 90 with respect to the tool 3 can be reduced. Further, the reduced relative vibration is detected as the second vibration, and the displacement of the tool 3 to the target portion 91 is started based on the arrival timing at which the workpiece 90 arrives at the return position in the displacement direction by the second vibration. Thus, the tool 3 can be displaced to the target portion 91 in a state where the relative displacement speed of the workpiece 90 with respect to the tool 3 is low. Moreover, the relative vibration of the workpiece 90 with respect to the tool 3 is reduced as described above. Therefore, the displacement of the target portion 91 until the tool 3 reaches the target portion 91 can be further reduced.

The control unit 115 may calculate the target arrival position of the tool 3 based on the conveyance speed of the workpiece 90 by the conveyor 5, the first vibration, and the position of the target portion 91 at the arrival timing, and control the arm 10 to start the displacement of the tool 3 to the target arrival position. For example, the control unit 115 calculates the time until the tool 3 reaches the target portion 91 based on the current position of the target portion 91, and calculates the displacement vector of the tool 3 for keeping the tool 3 follow the conveyance of the workpiece 90 and the first vibration based on the calculated time, the conveyance speed of the workpiece 90 by the conveyor 5, and the first vibration. The control unit 115 calculates the target arrival position by adding the calculated displacement vector to the current position of the target portion 91.

The target arrival position of the tool 3 is matched with the displacement of the target portion 91 by the conveyance by the conveyor 5 and the first vibration, and thus the tool 3 can arrive at the target portion 91 with higher accuracy.

The control unit 115 may control the arm 10 to arrange the tool 3 at the standby position separated from the workpiece 90 along the direction intersecting the displacement direction of the workpiece 90 by the vibration, and may control the arm 10 to start the displacement of the tool 3 from the standby position toward the target portion 91 based on the arrival timing (for example, at the arrival timing).

For example, the control unit 115 arranges the tool 3 below the workpiece 90 held by the hanger 51, and waits for the arrival timing while displacing the tool 3 following the conveyance of the workpiece 90 by the conveyor 5. The control unit 115 controls the arm 10 to start the displacement of the tool 3 from below toward the target portion 91 based on the arrival timing (for example, at the arrival timing).

By bringing the tool 3 close to the target portion 91 from the direction intersecting the direction of the displacement of the workpiece 90 caused by the vibration, it is easy to avoid collision between the workpiece 90 and the tool 3 caused by the vibration of the workpiece 90. Therefore, for example, it is possible to prevent the tool 3 from being damaged caused by collision with the large-sized workpiece 90.

The controller 100 may further include a speed evaluation unit (an example of "speed evaluation circuitry") 121 and a determination unit (an example of "determination circuitry") 122. The speed evaluation unit 121 evaluates a vibration speed of the vibration detected by the vibration detection unit 111. Namely, the vibration speed of the vibration is the speed of displacement caused by the vibration based on the detection result of the vibration. For example, the speed evaluation unit 121 calculates a value obtained by dividing the displacement amount from the return position to the next return position by the displacement time, or the like, as the evaluation result of the speed of displacement.

The determination unit 122 determines whether or not the work on the target portion 91 is possible based on the evaluation result of the speed of the displacement. For example, the determination unit 122 compares the evaluation result of the speed of displacement with a predetermined level, and determines that the work is possible when the evaluation result is lower than the predetermined level, and determines that the work is not possible when the evaluation result is higher than the predetermined level.

The control unit 115 may control the arm 10 to start the displacement of the tool 3 to the target portion 91 based on the arrival timing when the determination unit 122 determines that the work is possible, and may stop the displacement of the tool 3 to the target portion 91 when the determination unit 122 determines that the work is impossible. By determining whether or not the work is possible based on the evaluation result of the speed of displacement, it is possible to suppress the deviation between the target portion and the arrival position of the tool caused by the high speed of displacement.

The control unit 115 may select the first control mode when the evaluation result of the speed of displacement is higher than a predetermined level, and may select the second control mode when the evaluation result of the speed of displacement is lower than the predetermined level. In the first control mode, the control unit 115 waits for the arrival timing while controlling the arm 10 so as to displace the tool 3 following the conveyance of the workpiece 90 by the conveyor 5 without following the first vibration. In the second control mode, the control unit 115 waits for the arrival timing while controlling the arm 10 to displace the tool 3 following the conveyance of the workpiece 90 by the conveyor 5 and the first vibration. The estimation unit 114 may estimate the arrival timing at which the workpiece arrives at the return position in the direction of the displacement caused by the second vibration, based on the detection result of the second vibration.

It is possible to avoid the relative vibration of the workpiece with respect to the tool from becoming large on the contrary caused by the forced following to the first vibration.

The speed evaluation unit 121 may evaluate the speed of the displacement caused by the vibration based on the detection result of the first vibration. The speed of displacement caused by the vibration can be evaluated with higher reliability.

The controller 100 may further include a displacement prediction unit (an example of "displacement prediction circuitry") 123. The displacement prediction unit 123 predicts the displacement of the target portion 91 caused by the vibration based on the detection result of the vibration. For example, the displacement prediction unit 123 predicts the displacement of the target portion 91 caused by the vibration after the time point of predicting the displacement of the target portion 91, based on the actual performance of the vibration of the target portion 91 up to the time point.

The control unit 115 may calculate the target arrival position of the tool 3 based on the prediction result of the displacement of the target portion 91 from the arrival timing and the position of the target portion 91 at the arrival timing, and may start the displacement of the tool 3 toward the target arrival position. The tool 3 can be arranged at the target portion 91 with higher accuracy. For example, the control unit 115 calculates the time until the tool 3 reaches the target portion 91 based on the current position of the target portion 91, and calculates the displacement vector of the target portion 91 until the tool 3 reaches the target portion 91 based on the calculated time and the predicted result of the displacement of the target portion 91. The control unit 115 calculates the target arrival position by adding the calculated displacement vector to the current position of the target portion 91.

Figure 6:
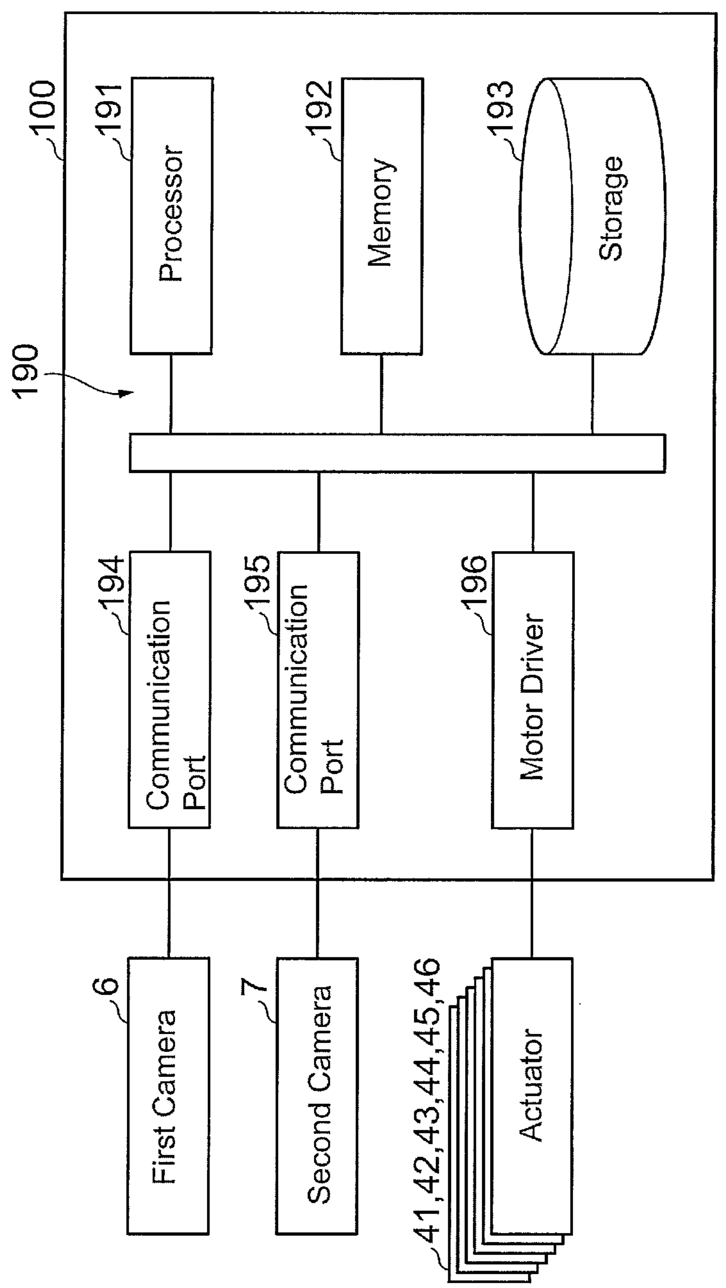
FIG. 6 is a block diagram illustrating a hardware configuration of a controller.

FIG. 6 is a block diagram illustrating a hardware configuration of the controller 100. As shown in FIG. 6, the controller 100 includes a circuit 190. The circuit 190 includes a processor 191, a memory 192, a storage 193, a communication port 194, 195, and a motor driver 196.

The storage 193 stores a program for causing the controller 100 to execute detecting the vibration of the workpiece 90, estimating an arrival timing at which the workpiece 90 arrives at the return position in the direction of the displacement caused by the vibration based on the detection result of the vibration, and controlling the arm 10 to start the displacement of the tool 3 to the target portion 91 based on the arrival timing. For example, the controller 100 stores a program for causing the controller 100 to configure the above-described functional blocks.

The storage 193 includes one or more storage devices. The storage device is a volatile storage medium such as a hard disk drive or a flash memory. The storage device may include portable media such as optical disks, magnetic disks, and the like.

The memory 192 temporarily stores the program loaded from the storage 193. The memory 192 includes one or more memory devices. The memory device is a volatile storage medium such as a random access memory.

The processor 191 causes the controller 100 to configure the above-described functional blocks by executing the program loaded into the memory 192. Data generated by the processor 191 is stored in the memory 192 as necessary.

The communication port 194 acquires an image from the first camera 6 based on a request from the processor 191. The communication port 195 acquires an image from the second camera 7 based on a request from the processor 191. The motor driver 196 supplies driving power to the actuator 41, 42, 43, 44, 45, 46 based on a request from the processor 191.

[Control Procedure]

As an example of the control method, a control procedure executed by the controller 100 will be exemplified. This procedure includes detecting the vibration of the workpiece 90, estimating the arrival timing at which the workpiece 90 arrives at the return position in the direction of the displacement caused by the vibration based on the detection result of the vibration, and controlling the arm 10 to start the displacement of the tool 3 to the target portion 91 based on the arrival timing.

Figure 7:
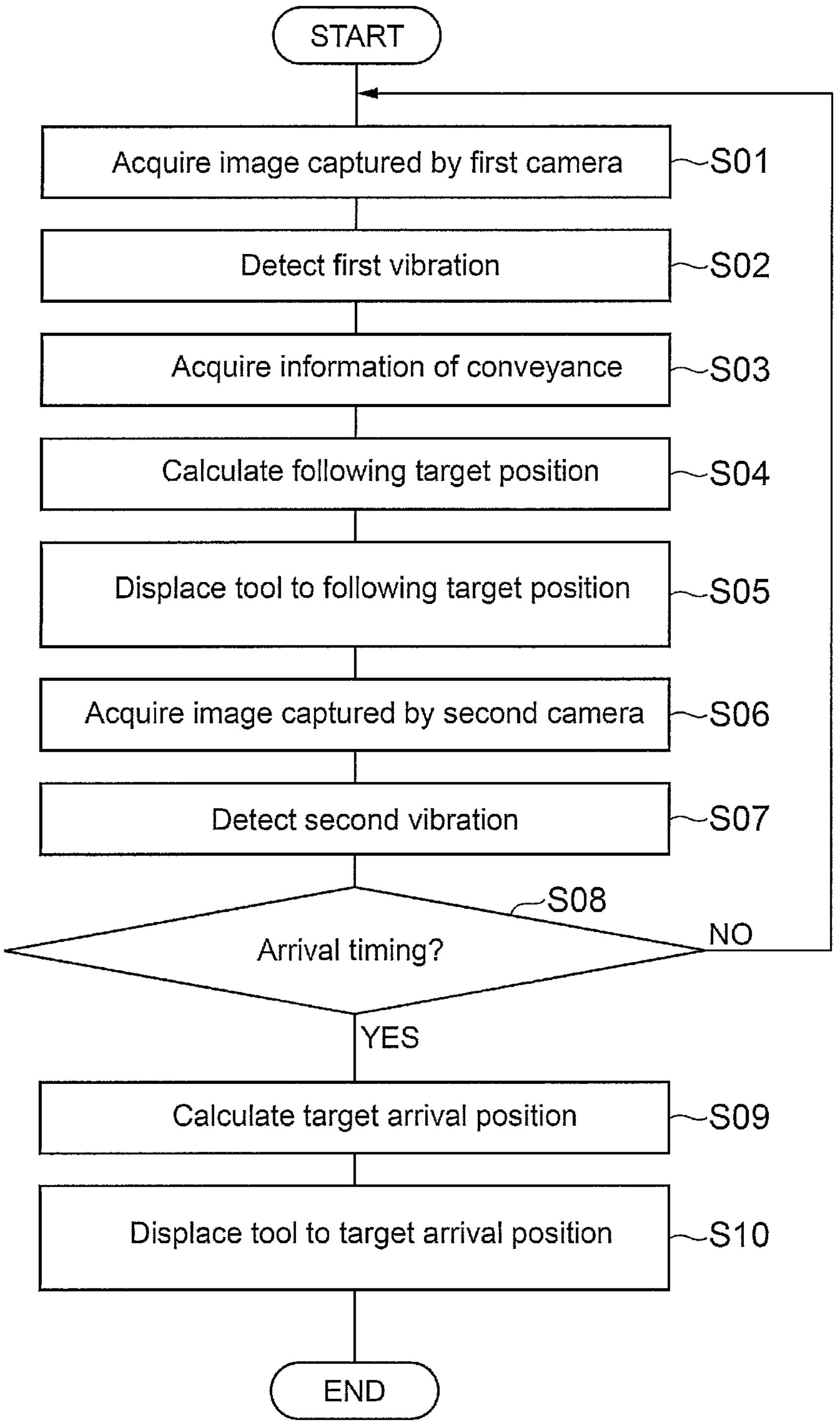
FIG. 7 is a flowchart illustrating a control procedure.

FIG. 7 is a flowchart illustrating a procedure until the displacement of the tool 3 to the target portion 91 is started. As shown in FIG. 7, the controller 100 first executes steps S01 and S02. In step S01, the first detection unit 112 acquires an image captured by the first camera 6. In step S02, the first detection unit 112 detects the first vibration based on the image captured by the first camera 6.

Next, the controller 100 executes steps S03, S04, and S05. In step S03, the control unit 115 acquires information such as the conveyance speed of the workpiece 90 from the host controller 200 or the like. In step S04, the control unit 115 calculates (updates) the following target position so as to follow the conveyance of the workpiece 90 and the first vibration. In step S05, the control unit 115 controls the arm 10 to displace the tool 3 to the following target position.

Next, the controller 100 executes steps S06, S07, and S08. In step S06, the second detection unit 113 acquires an image captured by the second camera 7. In step S07, the second detection unit 113 detects the second vibration based on the image captured by the second camera 7. In step S08, the estimation unit 114 estimates whether or not the current time is the arrival timing based on the detection result of the second vibration.

In step S08, when the controller 100 estimates that the current time is not the arrival timing, the controller 100 returns the process to step S01. Thereafter, until the current time reaches the arrival timing, the detection of the first vibration, the conveyance of the workpiece 90 and the tracking of the tool 3 to the first vibration, and the detection of the second vibration are repeated.

When the controller 100 estimates in step S08 that the current time is the arrival timing, the controller 100 executes steps S09 and S11. In step S09, the control unit 115 calculates the target arrival position of the tool 3 based on the conveyance of the workpiece 90, the first vibration, and the current position of the target portion 91. In step S11, the control unit 115 controls the arm 10 to displace the tool 3 to the target arrival position. The displacement of the tool 3 to the target portion 91 is completed in the above manner.

SUMMARY

The embodiments exemplified above include the following configurations.

(1) A robot system 1 including a robot 2 having a tool 3 for performing work on a target portion 91 of a workpiece 90 and an arm 10 for displacing the tool 3, a vibration detection unit 111 for detecting vibration of the workpiece 90, an estimation unit 114 for estimating an arrival timing at which the workpiece 90 arrives at a return position in a direction of displacement caused by the vibration based on a detection result of the vibration, and a control unit 115 for controlling the arm 10 to perform work on the target portion 91 based on the arrival timing.

In the vicinity of the return position in the direction of the displacement caused by the vibration, the speed of displacement of the workpiece 90 caused by the vibration is low. Therefore, by performing the operation on the target portion 91 based on the arrival timing at which the workpiece 90 arrives at the return position, the displacement of the target portion 91 until the tool 3 arrives at the target portion 91 can be reduced. Therefore, the robot system 1 is effective in arranging the tool 3 with high accuracy with respect to the workpiece 90 which vibrates.

(2) The robot system 1 according to (1), further including the conveyor 5 that conveys the workpiece 90, wherein the control unit 115 waits for the arrival timing while controlling the arm 10 to displace the tool 3 following conveyance of the workpiece 90 by the conveyor 5.

Since the tool 3 is displaced following the conveyance of the workpiece 90, the tool 3 is arranged in the vicinity of the target portion 91 until the arrival timing. Therefore, it is possible to shorten the time until the tool 3 reaches the target portion 91 after the arrival timing. Therefore, the displacement of the target portion 91 until the tool 3 reaches the target portion 91 can be further reduced.

(3) The robot system 1 according to (2), wherein the control unit 115 calculates the target arrival position of the tool 3 based on the conveyance speed of the workpiece 90 by the conveyor 5 and the position of the target portion 91 at the arrival timing, and controls the arm 10 to displace the tool 3 to the target arrival position.

By adjusting the target arrival position of the tool 3 to the displacement of the target portion 91 in the conveyance by the conveyor 5, the tool 3 can be made to arrive at the target portion 91 with higher accuracy.

(4) The robot system 1 according to any one of (1) to (3), in which the vibration detection unit 111 detects the vibration of the workpiece 90 with respect to the reference position P2 displaced together with the tool 3, and the estimation unit 114 estimates the arrival timing at which the workpiece 90 arrives at the return position in the displacing direction with respect to the tool 3.

The tool 3 can be displaced to the target portion 91 in a state where the relative displacement speed of the workpiece 90 with respect to the tool 3 is low. Therefore, the relative displacement of the target portion 91 with respect to the tool 3 until the tool 3 reaches the target portion 91 can be reduced.

(5) The robot system 1 according to (4), further including a camera 7 attached to the robot 2 to be directed toward the workpiece 90 from the reference position P2, wherein the vibration detection unit 111 detects the vibration of the workpiece 90 based on an image of the workpiece 90 captured by the camera 7.

The vibration of the workpiece 90 can be easily detected in a non-contact manner.

(6) The robot system 1 according to any one of (1) to (4), in which the vibration detection unit 111 includes the first detection unit 112 that detects the first vibration of the workpiece 90 with respect to the first reference position P1 not displaced together with the tool 3 and the second detection unit 113 that detects the second vibration of the workpiece 90 with respect to the second reference position P2 displaced together with the tool 3, the control unit 115 waits for the arrival timing while controlling the arm 10 to displace the tool 3 following the first vibration, and the estimation unit 114 estimates the arrival timing at which the workpiece 90 arrives at the return position in the displacement direction by the second vibration based on the detection result of the second vibration.

Since the tool 3 is displaced following both the conveyance of the workpiece 90 and the first vibration, the relative vibration of the workpiece 90 with respect to the tool 3 can be reduced. Further, the reduced relative vibration is detected as the second vibration, and the displacement of the tool 3 to the target portion 91 is started based on the arrival timing at which the workpiece 90 arrives at the return position in the displacement direction by the second vibration. Thus, the tool 3 can be displaced to the target portion 91 in a state where the relative displacement speed of the workpiece 90 with respect to the tool 3 is low. Moreover, the relative vibration of the workpiece 90 with respect to the tool 3 is reduced as described above. Therefore, the displacement of the target portion 91 until the tool 3 reaches the target portion 91 can be further reduced.

(7) The robot system 1 according to (6), wherein the control unit 115 calculates the target arrival position of the tool 3 on the basis of the first vibration and the position of the target portion 91 at the arrival timing, and controls the arm 10 to displace the tool 3 to the target arrival position.

By matching the target arrival position of the tool 3 with the displacement of the target portion 91 by the first vibration, the tool 3 can be caused to arrive at the target portion 91 with higher accuracy.

(8) The robot system 1 according to (6) or (7), further including: a first camera 6 attached to the periphery of the robot 2 to be directed toward the workpiece 90 from the first reference position P1; and a second camera 7 attached to the robot 2 to be directed toward the workpiece 90 from the second reference position P2, wherein the first detection unit 112 detects the first vibration based on an image captured by the first camera 6, and the second detection unit 113 detects the second vibration based on an image captured by the second camera 7.

Each of the first vibration and the second vibration can be easily detected in a non-contact manner.

(9) The robot system 1 according to (8), wherein the second camera 7 is attached to the robot 2 to be directed toward a first surface 92 of the workpiece 90 including the target portion 91, and the first camera 6 is attached to the periphery of the robot 2 to be directed toward a second surface 93 of the workpiece 90 different from the first surface 92. The degree of freedom in the arrangement of the first camera 6 can be increased.

(10) The robot system 1 according to any one of (1) to (9), in which the control unit 115 controls the arm 10 to dispose the tool 3 at the standby position separated from the workpiece 90 along a direction intersecting the direction of the displacement of the workpiece 90 caused by the vibration, and controls the arm 10 to displace the tool 3 from the standby position toward the target portion 91 on the basis of the arrival timing. It is easy to avoid collision between the workpiece 90 and the tool 3 caused by the vibration of the workpiece 90. Therefore, for example, it is possible to prevent the tool 3 from being damaged caused by collision with the large-sized workpiece 90.

(11) The robot system 1 according to (10) further includes the conveyor 5 including the hanger 51 that holds the workpiece 90 with the target portion 91 facing downward, the moving body 52 that hangs the hanger 51 from above, and the driving unit 53 that conveys the workpiece 90 held by the hanger 51 by displacing the moving body 52, wherein the control unit 115 controls the arm 10 to arrange the tool 3 below the workpiece 90 held by the hanger 51, wait for the arrival timing while displacing the tool 3 following the conveyance of the workpiece 90 by the conveyor 5, and displace the tool 3 toward the target portion 91 from below based on the arrival timing.

It is easy to avoid collision between the workpiece 90 and the tool 3 caused by the vibration of the workpiece 90. Therefore, for example, it is possible to prevent the tool 3 from being damaged caused by collision with the large-sized workpiece 90.

(12) The robot system 1 according to any one of (1) to (11), further includes a speed evaluation unit 121 that evaluates a speed of displacement by the vibration on the basis of a detection result of the vibration, and a determination unit 122 that determines whether or not work on the target portion 91 is possible on the basis of an evaluation result of the speed of displacement, in which the control unit 115 controls the arm 10 to displace the tool 3 to the target portion 91 on the basis of the arrival timing when the determination unit 122 determines that work is possible.

By determining whether or not the work is possible based on the evaluation result of the speed of displacement, it is possible to suppress the deviation between the target portion 91 and the arrival position of the tool 3 caused by the high speed of displacement.

(13) The robot system 1 according to (2), further includes the speed evaluation unit 121 that evaluates the displacement speed by the vibration based on the detection result of the vibration, wherein the vibration detection unit 111 includes the first detection unit 112 that detects the first vibration of the workpiece 90 with respect to the first reference position P1 not displacing with the tool 3 and the second detection unit 113 that detects the second vibration of the workpiece 90 with respect to the second reference position P2 displacing with the tool 3. The control unit 115 selects the first control mode when the evaluation result of the displacement speed is higher than a predetermined level, and selects the second control mode when the evaluation result of the displacement speed is lower than the predetermined level. The estimation unit 114 estimates the arrival timing at which the workpiece 90 arrives at the return position of the displacement direction by the second vibration based on the detection result of the second vibration.

It is possible to avoid the relative vibration of the workpiece 90 with respect to the tool 3 from becoming large on the contrary caused by the forced following of the first vibration.

(14) The robot system 1 according to (13), wherein the speed evaluation unit 121 evaluates the speed of the displacement caused by the vibration on the basis of the detection result of the vibration and the first vibration.

The speed of the displacement caused by the vibration can be evaluated with higher reliability.

(15) The robot system 1 according to any one of (1) to (14), further includes a displacement prediction unit 123 that predicts displacement of the target portion 91 caused by the vibration based on a detection result of the vibration, in which the control unit 115 calculates the target arrival position of the tool 3 based on a prediction result of displacement of the target portion 91 from the arrival timing and a position of the target portion 91 at the arrival timing, and displaces the tool 3 toward the target arrival position.

The tool 3 can be arranged at the target portion 91 with higher accuracy.

(16) A controller 100 for controlling a robot 2 includes a tool 3 for performing work on a target portion 91 of a workpiece 90 and an arm 10 for displacing the tool 3, the controller 100 including a vibration detection unit 111 for detecting vibration of the workpiece 90; an estimation unit 114 for estimating an arrival timing at which the workpiece 90 arrives at a return position in a direction of the displacement caused by the vibration based on a detection result of the vibration; and a control unit 115 for controlling the arm 10 to perform work on the target portion 91 based on the arrival timing.

(17) A control method including: detecting vibration of a workpiece 90, estimates an arrival timing at which the workpiece 90 arrives at a return position in a direction of the displacement caused by the vibration on the basis of a detection result of the vibration, and controls an arm 10 of a robot 2 to perform work on a target portion 91 of the workpiece 90 on the basis of the arrival timing.

Although the embodiments have been described above, the present disclosure is not necessarily limited to the above-described embodiments, and various modifications can be made without departing from the gist of the present disclosure.

What is claimed is:

1. A robot system comprising:
- a robot comprising:
  - a tool configured to perform work on a target portion of a workpiece; and
  - an arm to which the tool is connected and which is configured to move the tool;
- vibration detection circuitry configured to detect vibration of the workpiece in a vibration direction;
- estimation circuitry configured to estimate an arrival timing at which the workpiece arrives at a return position in the vibration direction based on the vibration detected by the vibration detection circuitry, the arrival timing being estimated at a moment when the vibration of the workpiece in the vibration direction has a displacement speed of zero; and
- control circuitry configured to control the arm based on the arrival timing such that the tool performs the work on the target portion.

2. The robot system according to claim 1, further comprising:
- a conveyor configured to convey the workpiece at a conveying speed,
- wherein the control circuitry is configured to wait for the arrival timing while controlling the arm to move the tool in accordance with a motion of the workpiece conveyed by the conveyor.

3. The robot system according to claim 2,
- wherein the control circuitry is configured to calculate a target arrival position of the tool based on the conveying speed of the workpiece at the arrival timing and a position of the target portion at the arrival timing, and
- wherein the control circuitry is configured to control the arm to move the tool to the target arrival position.

4. The robot system according to claim 1,
- wherein the vibration detection circuitry is configured to detect the vibration in the vibration direction of the workpiece with respect to a reference position which moves together with the tool, and
- wherein the estimation circuitry is configured to estimate the arrival timing in the vibration direction with respect to the reference position.

5. The robot system according to claim 4, further comprising:
- a camera which is attached to the robot to capture an image of the workpiece from the reference position,
- wherein the vibration detection circuitry is configured to detect the vibration of the workpiece based on the image of the workpiece captured by the camera.

6. The robot system according to claim 1,
- wherein the vibration detection circuitry comprises
  - first detection circuitry configured to detect a first vibration in a first vibration direction of the workpiece with respect to a first reference position which does not move together with the tool, and
  - a second detection circuitry configured to detect a second vibration in a second vibration direction of the workpiece with respect to a second reference position which moves together with the tool,
- wherein the control circuitry is configured to wait for the arrival timing while controlling the arm to move the tool in accordance with the first vibration, and
- wherein the estimation circuitry is configured to estimate the arrival timing at which the workpiece arrives at the return position in the second vibration direction based on the second vibration detected by the second detection circuitry.

7. The robot system according to claim 6,
- wherein the control circuitry is configured to
  - calculate a target arrival position of the tool based on the first vibration and a position of the target portion at the arrival timing, and
  - control the arm to move the tool toward the target arrival position.

8. The robot system according to claim 6, further comprising:
- a first camera which is attached to a periphery of the robot to capture an image of the workpiece from the first reference position; and
- a second camera which is attached to the robot to capture an image of the workpiece from the second reference position,
- wherein the first detection circuitry is configured to detect the first vibration based on the image captured by the first camera, and
- wherein the second detection circuitry is configured to detect the second vibration based on the image captured by the second camera.

9. The robot system according to claim 8,
- wherein the second camera is attached to the robot to capture an image of a first surface including the target portion of the workpiece, and
- wherein the first camera is attached to the periphery of the robot to capture an image of a second surface of the workpiece, the second surface being not the first surface.

10. The robot system according to claim 1,
wherein the control circuitry is configured to
control the arm to position the tool at a standby position which is away from the workpiece along a direction which intersects the vibration direction, and
control the arm to move the tool from the standby position toward the target portion based on the arrival timing.

11. The robot system according to claim 10, further comprising:
a conveyor comprising:
a hanger configured to hold the workpiece which has the target portion facing downward,
a moving body configured to suspend the hanger from above, and
a driver configured to move the moving body to convey the workpiece held by the hanger,
wherein the control circuitry is configured to position the tool below the workpiece held by the hanger, configured to wait for the arrival timing while controlling the arm to move the tool in accordance with a motion of the workpiece conveyed by the conveyor, and configured to control the arm based on the arrival timing to move the tool from below toward the target portion.

12. The robot system according to claim 1, further comprising:
speed evaluation circuitry configured to evaluate a vibration speed of the vibration based on the vibration detected by the vibration detection circuitry; and
determination circuitry configured to determine whether or not the work on the target portion is possible to be performed based on an evaluation result of the vibration speed,
wherein the control circuitry is configured to control the arm based on the arrival timing such that the tool performs the work on the target portion when the determination circuitry determines that the work is possible to be performed.

13. The robot system according to claim 2, further comprising:
speed evaluation circuitry configured to evaluate a vibration speed of the vibration based on the vibration detected by the vibration detection circuitry,
wherein the vibration detection circuitry comprises
first detection circuitry configured to detect a first vibration in a first vibration direction of the workpiece with respect to a first reference position which does not move together with the tool, and
a second detection circuitry configured to detect a second vibration in a second vibration direction of the workpiece with respect to a second reference position which moves together with the tool,
wherein the control circuitry is configured to
select a first control mode when an evaluation result of the vibration speed is higher than a predetermined level, and select a second control mode when the evaluation result of the vibration speed is lower than the predetermined level,
wait for the arrival timing, in the first control mode, while controlling the arm to move the tool in accordance with the motion of the workpiece conveyed by the conveyor, and
wait for the arrival timing, in the second control mode, while controlling the arm to move the tool in accordance with the first vibration and the motion of the workpiece conveyed by the conveyor and,
wherein the estimation circuitry is configured to estimate the arrival timing at which the workpiece arrives at the return position in the second vibration direction based on the second vibration detected by the second detection circuitry.

14. The robot system according to claim 13,
wherein the speed evaluation circuitry is configured to evaluate the vibration speed of the vibration based on the first vibration detected by the first detection circuitry.

15. The robot system according to claim 1, further comprising:
displacement prediction circuitry configured to predict a displacement of the target portion caused by the vibration based on the vibration detected by the vibration detection circuitry,
wherein the control circuitry is configured to
calculate a target arrival position of the tool based on a position of the target portion at the arrival timing and the predicted displacement of the target portion from the arrival timing, and
move the tool toward the target arrival position.

16. The robot system according to claim 1,
wherein the control circuitry is configured to control the arm based on the arrival timing such that a displacement of the tool toward the target portion starts at the arrival timing.

17. A controller comprising:
vibration detection circuitry configured to detect vibration of a workpiece in a vibration direction;
estimation circuitry configured to estimate an arrival timing at which the workpiece arrives at a return position in the vibration direction based on the vibration detected by the vibration detection circuitry, the arrival timing being estimated at a moment when the vibration of the workpiece in the vibration direction has a displacement speed of zero; and
control circuitry configured to control an arm of a robot based on the arrival timing such that a tool connected to the arm performs work on a target portion of the workpiece.

18. The controller according to claim 17,
wherein the control circuitry is configured to control the arm based on the arrival timing such that a displacement of the tool toward the target portion starts at the arrival timing.

19. A control method comprising:
detecting vibration of a workpiece in a vibration direction;
estimating an arrival timing at which the workpiece arrives at a return position in the vibration direction based on the detected vibration, the arrival timing being estimated at a moment when the vibration of the workpiece in the vibration direction has a displacement speed of zero; and
controlling an arm of a robot based on the arrival timing such that a tool connected to the arm performs work on a target portion of the workpiece.

20. The control method according to claim 19,
wherein the arm of the robot is controlled based on the arrival timing such that a displacement of the tool toward the target portion starts at the arrival timing.

* * * * *